June 8, 1954   H. A. QUIST   2,680,450
LIQUID SEALED VALVE
Filed Dec. 13, 1951   2 Sheets-Sheet 1
Fig./
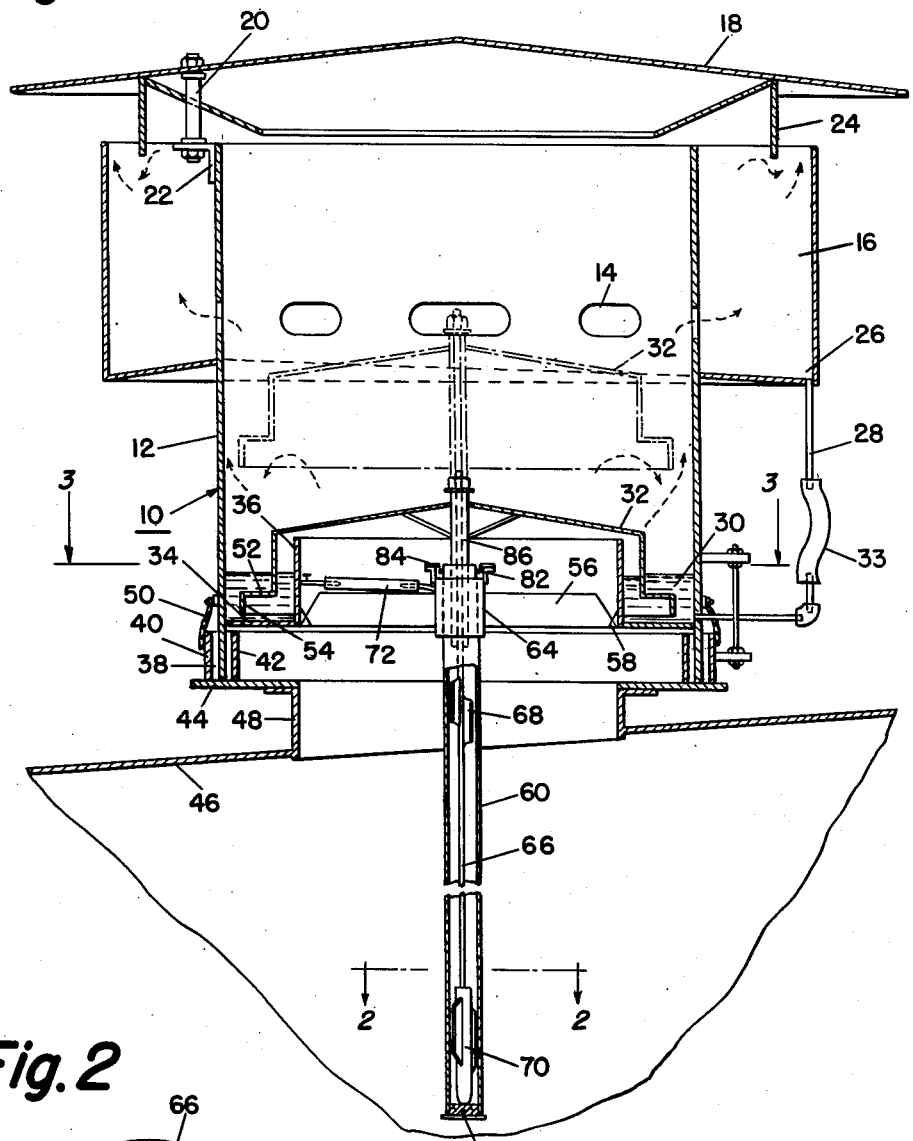
Fig.2
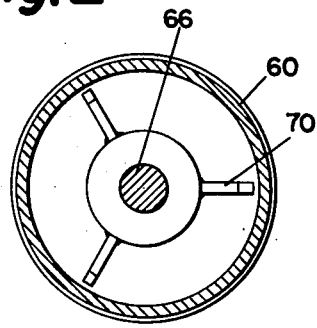
*INVENTOR.*
HAROLD A. QUIST
BY
ATTORNEYS

INVENTOR.
HAROLD A. QUIST
BY
ATTORNEYS

Patented June 8, 1954

2,680,450

UNITED STATES PATENT OFFICE 2,680,450

LIQUID SEALED VALVE

Harold A. Quist, Swarthmore, Pa., assignor to Sun Oil Company, Philadelphia, Pa., a corporation of New Jersey Application December 13, 1951, Serial No. 261,564

4 Claims. (Cl. 137—248)

This invention relates to liquid seal valves and in particular is directed to a valve of this type designed for controlling vapor or gas release from pressure chambers or storage vessels.

The effectiveness of liquid sealed pressure valves depends upon the maintenance of the liquid volume at a proper level relative to the movable valve member. This is particularly true where the valve member is lifted by the excessive storage tank pressure and the relieved gas passes over the sealing liquid. Under such circumstances the relieved gases entrain particles of the liquid and carry them away from the valve seal. In due time the valve is depleted of the sealing liquid requiring constant attention to avoid this condition. It is an object of this invention to disclose a device in which the entrained liquid particles are recaptured and returned to sealing relation with the movable valve member.

Another difficulty experienced with valves of this type is maintaining the valve member at a uniform depth within the sealing liquid, thereby enabling a predetermined pressure to be maintained within the storage vessel. Ordinarily these valves are mounted on the tops of pressure chambers or storage vessels. The roofs of these vessels are sloped for the practical purpose of shedding snow, rain, and wind loads as a structural feature. In order to preserve a uniform depth of liquid about the valve member, extreme care must be taken in mounting the valve housing on the sloping roof of the storage tank. Even under conditions where extreme care is taken the weight or eccentric loading of the valve housing will tend to disturb the relation between the liquid and the movable valve member which prevents the proper operation of the valve. Further, any pressure change under or on the roof will affect the relative levels of the valve member and the liquid seal. It is, therefore, another object of this invention to provide a liquid sealed valve so designed that it will always assume the proper depth relation between the sealing liquid and the movable valve member regardless of the roof slope of the storage tank.

The invention consists in the details of construction and in the combination and arrangement of the several parts of a pressure relief valve directed to preserving the liquid seal in operating volume. The attention required to maintain the operating volume of the liquid is reduced by conserving the supply and the level of the seal remains at a uniform and effective depth.

In the present invention, a housing structure passages the relief gases in such a manner as to recapture the entrained liquid particles. An auxilliary circumferential chamber is positioned outside the main housing body along the path of relief gas flow and drains the recaptured liquid through a piping system back to the loci of the liquid seal. The movable valve member is of the reciprocating type which is normally in peripheral contact with the body of the sealing liquid. A centrally positioned weighted rod is fastened to the valve member and slidably engages a positioning tube. Within the tube, liquid is maintained as a part of the operating mechanism. The tube is supported in a pivoted structure designed to remain perpendicular due to the effect of gravity regardless of any shift in position from the vertical assumed by the valve housing on the roof of the storage vessel. Thus, as the liquid volume is maintained as a sufficient seal and naturally assumes a horizontal position, vertically positioned guide elements attached to the valve member keep the liquid evenly distributed, both as a seal and also as a lubricant in the tube, at an effective operating depth.

For a more complete understanding of the nature and scope of the invention in which the above noted objects and others will be evident, reference is made to the following detailed description read in connection with the accompanying drawing in which:

Figure 1 is a sectional view in elevation of the device showing the normal operating positions of the valve member.

Figure 2 is a sectional view of a part of Figure 1 taken along lines 2—2.

Figure 3:
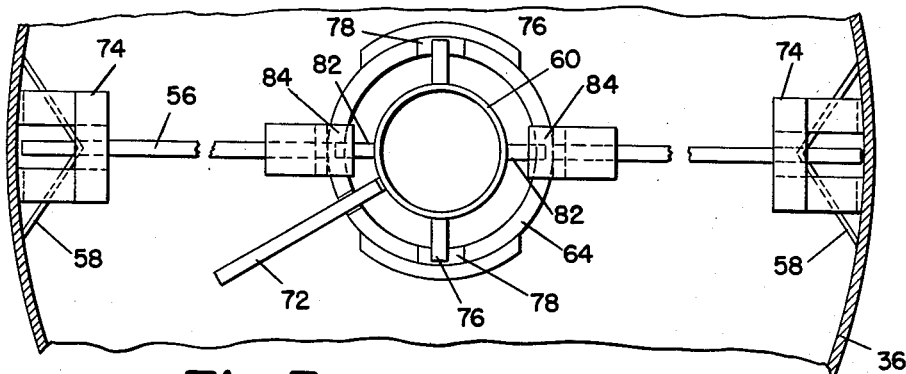
Figure 3 is a plan view of a section of Figure 1 taken along lines 3—3, omitting all except the internal support portion.

Referring to Figure 1, the housing of the valve body in which the pressure relief valve member is arranged is designated by the numeral 10. Although the valve housing may be any desired shape in cross section, the preferred embodiment is cylindrical, due to ease of manufacturing and handling and the operating relationship of the various parts. The wall 12 of the housing is apertured as at 14 to permit the escape of the vented pressure gases during the valve operation. A baffle chamber 16 is positioned to surround the wall 12 at the elevation of the apertures 14 and receive the vented gases as they escape from the storage tank. A cover 18 is secured to the valve wall 12 as by bolts 20 and clips 22 and includes a baffle 24 causing the vented gases to be diverted from a direct path of escape, and in the resulting turbulence, causing the entrained moisture particles to be dropped into the chamber 16.

The entrained particles of sealing liquid, which may be glycol, glycerine, light lubricating oil, water, brine, etc., are drained to a low point indicated as 26 by the proper sloping of the bottom of the baffle chamber 16 and feeds the recaptured sealing and lubricating liquid directly into a connecting pipe 28. This pipe returns the recovered liquid directly to the loci of the liquid requirement, shown on Figure 1 as trough 30 and tube 60. A flexible pipe connector 33 is used in the pipe system 28 to permit the valve body to expand and contract without injury to the piping system.

The locus or trough 30, which supports the sealing liquid in engagement with the movable valve member 32, is formed within the wall 12 of the valve body 10 by an annular chamber comprising a bottom 34 and an upstanding flange 36. The annular trough, so formed, is secured to the wall 12 and forms a permanent part of the valve body rigidly fixed thereto and is positioned by the valve body 10.

A simple form of housing which facilitates dismantling and ready cleaning, as well as ease in erection, is shown in Figure 1. A circular groove 38 is formed to receive the wall 12 of the valve body 10 by flanges 40 and 42, perpendicularly fastened to the plate 44 which in turn is mounted on the tank 46 by the collar 48 or similar attaching flange. A weather guard 50 is secured circumferentially to the wall 12 of the valve body and deflects rain from the circular groove 38 which positions the valve body wall 12.

The valve member 32, fashioned with a flange 52 and a depending flange 54 for operational engagement with the sealing liquid, is concentrically positioned to reciprocate within the valve body 10. The purpose and use of the flange 52 and dependent flange 54 is illustrated and discussed in my Patent No. 2,527,892, issued October 31, 1950, and although this construction lends considerable operational value to the device herein disclosed, as noted later in discussing the operation, reference is made to that patent for full details. Within the passage through the trough 30, which holds the liquid seal, a support 56 is suspended in knife-edged engagement with bearings 58 permitting pivotal movement of the valve supporting rod and tube in a direction transverse the drawing, as indicated in Figure 1. The tube 60 sealed by the plate 62 at the bottom is positioned concentrically of the valve housing by the sleeve 64 fastened to the support 56. Centering vanes 68 and 70 (Fig. 2) position the rod 66 in sliding engagement with the tube 60 and keep the valve member 32 in proper operating position for lifting from and returning to the sealing liquid. The volume of sealing liquid maintained in the tube 60 is used as a lubricant to prevent ice and gum from forming between the movable rod 66 and the tube and is kept at operating level relative to the liquid seal in the trough 30 by means of the flexible pipe connector 72. Thus the liquid necessary to operation of the device is maintained at operating level by a conduit system designed to return the recaptured liquid particles. It will be recognized that this conduit system is also a direct feed line greatly assisting the distribution of the liquid in the device during periodic servicing.

Figure 4:
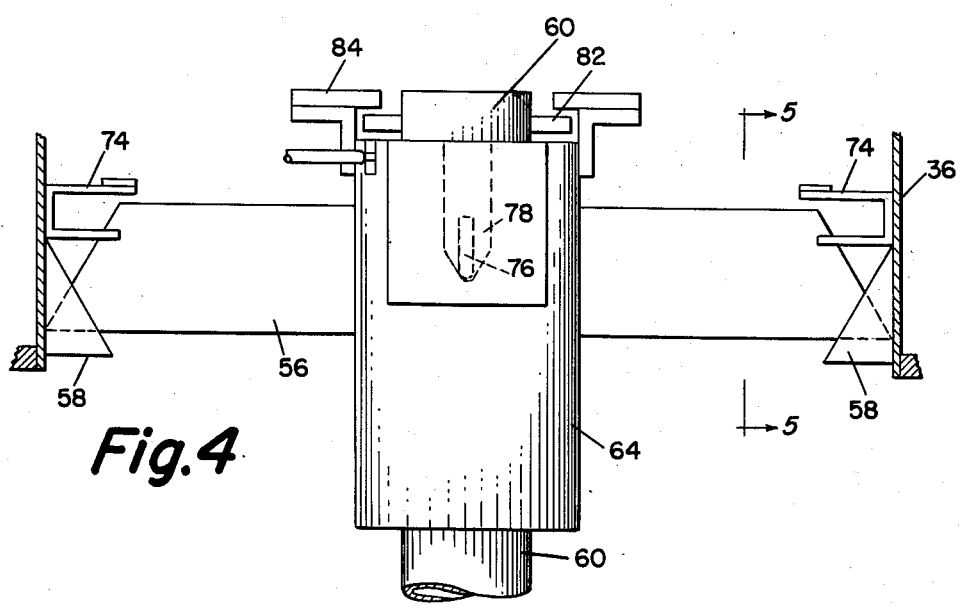
Figure 4 is an elevation of the detail of Figure 3.
Figure 5:
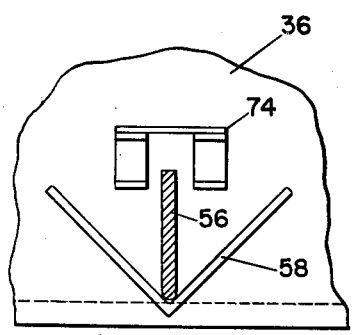
Figure 5 is a section of Figure 4 taken along lines 5—5.

Attention is now directed to Figures 3, 4, and 5 for further description of the details of the pivotal suspensions of the guide tube 60. The pivotal supports 58, illustrated in all three Figures 3, 4, and 5, position the knife-edged bearing member 56 resting therein within the passage through the trough seal 30. Retainers 74 above the bearing 58 prevent the support member 56 from being lifted out of the bearing 58 by excess tank pressures.

As has been noted, the sleeve 64 is attached to the support 56 concentrically of the housing 10 to receive the rod 66 attached to the valve member 32. Pivotal bearings 76 are attached to the tube 60 and fit into the pivot recesses 78 in the sleeve 64 transverse the longitudinal axis of the member 56. This permits the rod 66 passing through the sleeve 86 fastened to the valve member 32 and fixed relative thereto as by the nut and washer assembly shown to be pivoted in the plane of the drawing, as indicated in Figure 1. The pivotal bearings 76 rest in knife-edged bearings 78 formed in the sleeve 64, as shown in Figures 3 and 4. Stop lugs 82 are positioned to contact the stops 84 and prevent the tube 60 from lifting from the operating position should the pressure on the tank 46 become excessive.

The proper operation of the pressure relief valve of this invention requires that the movable elements be designed to respond within the limits of the predetermined pressures to be relieved. The weight of the valve member 32, together with the orienting rod 66 and the centering vanes 68 and 70, must be selected and of a proper relative size and weight to lift clear of the sealing liquid in the trough 30 in response to a predetermined excess pressure in the storage tank.

Once designed to give proper response, the valve housing 10 can be mounted at any desired location on the roof of the storage vessel without affecting the operation. To place the valve in operation, the sealing liquid can be poured directly into the receiving trough 30 or may be poured into chamber 16 and find its proper level through the conduit system by gravity flow. This, too, can be the adopted way of adding liquid to the valve during periodic servicing.

When the sealing liquid reaches the proper operating level in trough 30, it will have filled the tube 60, enclosing the rod 66 in engagement therewith, and reach the proper operating level around the flanged periphery of the valve member 32. In addition to acting as a seal, it will be understood that liquids of various types are used in relief valves for storage tanks as lubricants to prevent corrosion and sticking by freezing. This is, as previously explained, the primary reason for the liquid such as glycol in the tube 60.

Under normal operating conditions where the internal pressure of the storage vessel is not in excess of that for which it is designed and relief is not required, the valve member 32 will assume the sealing position shown in heavy lines in Figure 1. When an excess pressure is reached that will overcome the balance of the valve member and the various elements connected thereto, the member 32 will be lifted slowly until the flange 52 reaches the level of the sealing liquid. As soon as the flange 52 rises above the level of the liquid, the effective area subjected to the pressure of the gases to be relieved is suddenly increased and the valve member 32 is rapidly lifted clear of the liquid to assume a position such as is shown by the dotted lines in Figure 1. The relieved gases then flow around the valve member, as shown by the arrows and dotted lines, and out through the apertures 14 to encounter the baffle means prior to venting to the atmosphere. The change of direction as the relieved gases go through the apertures 14 and the chamber 16, in addition to the change of temperature, causes the entrained particles of sealing liquid to deposit out in the chamber 16. After this liquid condenses and flows to the lowest part of the chamber, it will return through the conduit system 28 and 33 to the trough 30. The liquid level in tube 60 will be maintained by the flow of the liquid through the connector 72 from the trough to the tube 60.

The valve member 32 having been lifted by the excess pressure within the storage vessel is retained in concentric relation to the valve body by the rod 66. In this way, the return of the valve member to sealing engagement with the sealing liquid, properly oriented, is assured after the pressure in the storage vessel has been relieved.

It will be noted that there is a clearance around the flanged periphery of the valve member 32 affording considerable play of that element with respect to the interior of the wall 12 of the valve housing 10. This clearance is intentional and affords free movement of the valve member 32 which may be required due to the pivoting adjustment of the tube 60 maintaining the valve member 32 horizontal and at uniform depth relative to the level of the sealing liquid in the trough 30. Any tilt from the perpendicular caused by sagging of the storage vessel roof, poor erection, wind damage, etc., will be corrected in the pivoting adjustment of the member 56 and the sleeve 86 which has been described as pivoting transversely to the member 56. These two pivotal suspensions at 90° to each other permit the valve member to be maintained at all times in a horizontal position and in proper relation in depth of penetration with respect to the sealing liquid regardless of any shift in the valve housing. Thus, the effective pressure predetermined for the operation of this relief valve is never reduced because of diminishing or uneven depths of sealing liquid due to misalignment of the apparatus. Consequently proper and predetermined operation at all times is assured.

I claim:

1. A relief valve for controlling the discharge of gases from storage vessels comprising a housing, a trough seal adapted to contain a liquid peripherally engaging the interior of said housing and allowing a passage for the transmission of gases under pressure through the center thereof, a reciprocatory bell-type valve element peripherally flanged to project downwardly into sealing relation with said trough normally sealing the center passage, a guide rod concentrically connected to and extending downwardly from said valve element and pivotal means suspended in the trough seal passage adapted to receive said guide rod and maintain it in the vertical position.

2. A relief valve for controlling the discharge of gases from storage vessels comprising a housing, a trough seal adapted to contain a liquid peripherally engaging the interior of said housing and allowing a passage for the transmission of gases under pressure through the center thereof, a reciprocatory bell-type valve element peripherally projecting downwardly into sealing relation with said trough normally sealing the center passage, a guide rod concentrically connected to and extending downwardly from said valve element, a positioning tube pivotally suspended in the trough seal passage to receive said rod and adapted to maintain the same in the vertical position.

3. A relief valve for controlling the discharge of gases from storage vessels comprising a housing, a trough seal adapted to contain a liquid peripherally engaging the interior of said housing and allowing a passage for the transmission of gases under pressure through the center thereof, a reciprocatory bell-type valve element peripherally flanged downwardly for sealing engagement with said trough, a guide rod concentrically attached to the valve element and extending downwardly through the passage in the trough seal, a tube adapted to slidably receive said guide rod, and pivotal means supported within said trough passage to suspend said tube and maintain the valve member horizontally within the trough seal.

4. A relief valve for controlling the discharge of gases from storage vessels comprising a housing, a trough seal adapted to contain a liquid peripherally engaging the interior of said housing and allowing a passage for the transmission of gases under pressure through the center thereof, a reciprocatory bell-type valve element peripherally flanged downwardly for sealing engagement with said trough, a guide rod concentrically attached to the valve element and extending downwardly through the passage in the trough seal, a tube concentric of said trough in sliding engagement with said guide rod, suspension means pivotally suspended at diametrically spaced points on the periphery of the passage in the trough seal and supporting the tube for movement about the pivotal axis, and supports externally of said tube extending transverse the pivotal axis of the suspension means into pivotal engagement with said suspension means.

References Cited in the file of this patent

UNITED STATES PATENTS

| Number | Name | Date |
|---|---|---|
| 1,727,785 | Roth | Sept. 10, 1929 |
| 2,527,892 | Quist | Oct. 31, 1950 |

FOREIGN PATENTS

| Number | Country | Date |
|---|---|---|
| 706,015 | Germany | May 15, 1941 |